Dec. 28, 1937.　　　　P. A. KINZIE　　　　2,103,465
BEARING
Filed Aug. 3, 1934
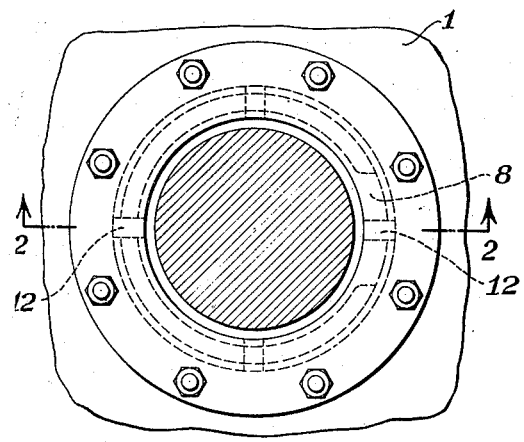
Fig. 1
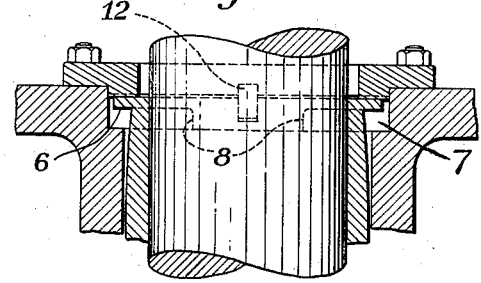
Fig. 3
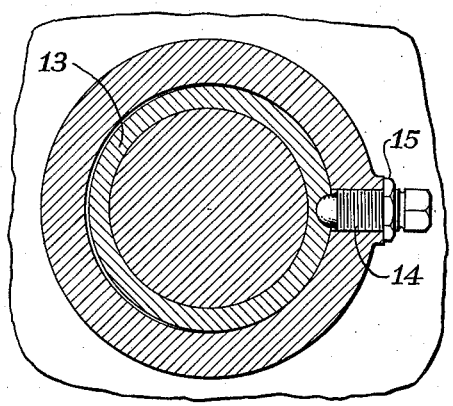
Fig. 6
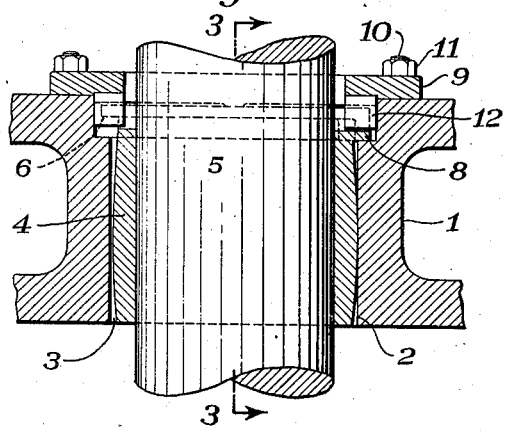
Fig. 2
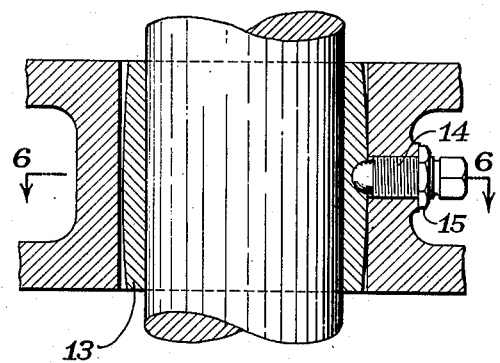
Fig. 5
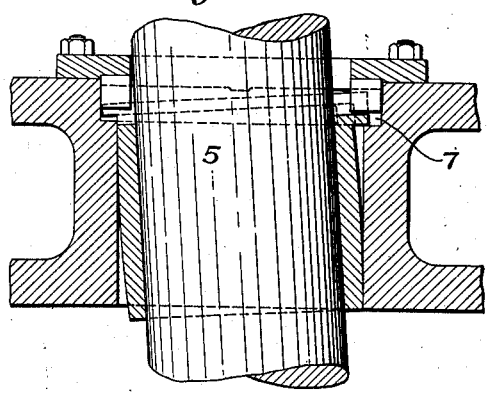
Fig. 4
INVENTOR.
PHILLIP A. KINZIE
BY 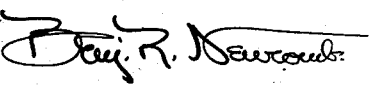
ATTORNEY.

Patented Dec. 28, 1937

2,103,465

UNITED STATES PATENT OFFICE 2,103,465

BEARING

Phillip A. Kinzie, Denver, Colo., assignor to Universal Hydraulic Corporation, Denver, Colo., a corporation of Colorado Application August 3, 1934, Serial No. 738,205

1 Claims. (Cl. 308—72)

This invention is a bearing, or a combination of bearings, for use under conditions in which the bearing or bearings must be self-adjusting to compensate for unequal bearing load resulting from bearing misalignment due to shaft deflections of varying magnitude such, for instance, as may occur with large hydraulic apparatus like throttling valves of the butterfly type in which the static head on the valve closure element, when in the closed position, or during movement may deflect the stem axis in a varying manner.

Self-adjusting bearings are, of course, well known in the art, but have been of the type where low bearing pressure rendered it unnecessary to consider the fact that without adjustment the bearing loads might be of such magnitude as to actually squeeze the metal out of the bearing unless redistribution of bearing load is taken care of even in static position.

The bearing of the present invention, and its combinations, has been developed for use as stem bearings in valves of the type described in the issued patent to Phillip A. Kenzie et al. 1,951,283, and in the pending application of Phillip A. Kinzie et al., Serial No. 660,284 filed in the United States Patent Office, March 10, 1933, and which type are being incorporated as control valves for the one hundred and seventy thousand (170,000) horsepower hydraulic turbines being installed in the United States Bureau of Reclamation Project of the Boulder Dam of the Colorado River, and which are the most powerful hydraulic turbines in the world.

Such valves as are referred to for control of these turbines are as large as fourteen feet in diameter; designed to handle a maximum working head of six hundred ninety feet (690') and must be capable of operation at a maximum flow of eight thousand (8,000) cubic feet per second, thus requiring an operating mechanism having a turning effort of twenty-five million inch pounds to overcome energy of flow through the valve of nearly three quarters of a million horsepower. The foregoing figures impart some idea of the magnitude of the problems involved in determining adequate bearing protection to insure uninterrupted operation of the valve.

This invention contemplates a cylindrically bored body receiving a shaft, but with a bearing bushing between the shaft and the body, this bushing and body having adjacent surfaces cooperatingly shaped for rocking movement of the bushing in the body bore during pressure contact to compensate for misalignment between shaft and body bore axes.

More particularly the present invention comprehends a bearing of the above described character wherein the adjacent cooperating surfaces of the body bore and bushing are curved so as to permit of the rocking movement of the bushing while maintaining adequate pressure bearing contact to prevent destruction of the metal of either the bushing or body, and yet with all the universal rocking movement of the bushing in the body bore, the bushing and body are so related as to preclude axial or torsional movement of the bushing.

With the foregoing in view there will now be described specific embodiments of the invention, and which are illustrated in the accompanying drawing forming a part of this specification, and in which:

Figure 1 is a top plan view of a body and bushing combined to produce a bearing according to the present invention.

Figure 2 is a sectional side elevation on the line 2—2 of Figure 1 with the bushing in normal axial alignment with the shaft axis, and with the axis of shaft and bushing parallel to the axis of the bore of the body.

Figure 3 is a fragmentary sectional side elevation on the line 3—3 of Figure 2, or in a plane diametrically opposite to the plane of the section of Figure 2.

Figure 4 is a sectional side elevation in the same plane as Figure 2, but showing the bushing displaced in the body bore due to deflection of the shaft.

Figure 5 is a sectional side elevation of a slightly modified form.

Figure 6 is a sectional plan view on the line 6—6 of Figure 5.

The body (1) which, for example, may be a part of a valve casing of the type of valve described in the issued patent, and co-pending application hereinbefore identified, is bored as indicated at (2) with clearance as shown at (3) to receive a rocking bushing (4) curved on its exterior, as shown, and which curve may represent a parabolic surface for convenience in calculation.

In the design of such a bearing the character of the bushing (4) may be determined only after determination of the maximum angular deflection of the shaft (5) and its cooperating parts; the exterior shape of the rocking surface, which may be either of constantly changing radius or a parabolic surface must be selected, then, inasmuch as this curved exterior surface of the bushing (4) is not the equivalent of a spherical bearing, clearance (3) must be provided between its central major diameter and the cylindrical bore (2) within which it is to rock in order to obviate binding and interference.

As will be seen from the profile sections of the drawing (Figs. 2, 3, and 5), the curvature of the rocking surface is relatively small in that it approaches the straight line element which generates the cylindrical bore (2).

Also, the location of contact between bushing (4) and bore (2), with respect to the axial length of the bushing (4), when under full load must be determined and located far enough back from the end of the bushing (4) so as to permit sufficient bearing area to be developed so as to safely transmit into the wall of the body bore (2), without injury, the reactive pressure imposed upon the bushing (4), by deflection of the shaft (5).

The bushing (4), while being thus relatively free to follow deviations from alignment of the shaft (5) due to variable loadings must be retained in substantially the same axial position with respect to the length of the body bore (2).

It was found that with a bearing load of over five million pounds on each bushing of a valve of the type herein referred to, and with even the most efficient lubrication, sliding of the bushing (4) upon the shaft (5), as flexure and counter-flexure occurred, caused the combination of the shaft (5), bushing (4), and body (1) to act as a jack tending to move the bushing (4) axially of the bore (2) of the body (1). In order to overcome this tendency the bushing (4) is formed at its upper end with a lip (6) which enters a counter-bore (7) in the bore (2) of the body (1), as shown in Figures 1 to 4 inclusive; the said lip (6) is thickened as at (8) and is loosely confined between a cap member (9) secured by studs (10) and nuts (11). Diametrically spaced blocks (12) enter cooperating recesses in the lip (6) and cap member (9) and thus, by these means, the bushing is prevented from being displaced longitudinally and from rotating torsionally about its own axis.

It is to be particularly noted in Figure 4 that here the bearing is shown with the bushing (4) rocked to the left by deflection of the axis of the shaft (5), the bushing (4) moving in the same manner as does the rocker of an ordinary household rocking chair in contact with the floor; and thus the contact between bushing (4) and bore (2) has now moved downward to a lower position than in Figure 2, and has contacted diagonally opposite at the upper end. It will also be noted that the lip (6), member (8), and blocks (12) have in no wise interfered with the rocking motion of the bushing (4) while, at the same time, they are fully effective for their respective functions of maintaining the bushing (4) in its correct endwise relation against major displacement axially and to prevent the said bushing (4) from rotating torsionally without restricting the rocking motion thereof.

It will be obvious that since the bushing (4) is not supported on its external diameter to the extent that is the case with pressed bushings, that is to say, throughout its full length, the bearing pressures will not be exactly equal throughout the entire length of the bearings. It will likewise be obvious that at the elliptically shaped contact zones where the external surface of the bushing (4) is in contact with the wall of the bore (2) there is a rolling action but that no rubbing occurs; and it is interesting to note that with the size of valve and the conditions hereinbefore mentioned contact pressures in these elliptical zones are quite moderate, being less than 15,500 lbs. per square inch.

In the type of bearing shown in Figures 5 and 6 the action is the same as that described in connection with Figures 1 to 4, and the construction differs only in that rocking bushing (13) is locked against torsional and axial movement endwise by a single element, namely, a spherical headed set screw (14) entering a corresponding depression in the bushing (13) properly placed with respect to possible deflection and locked by the nut (15).

While, in the foregoing, there has been described certain specific embodiments of the invention in order to conform to the statutes, it is, nevertheless, to be understood that the invention is not limited thereby, but that any modifications falling within the scope of the appended claim are intended to be included in the patent.

I claim:

The combination comprising a shaft; a body having a cylindrical bore encircling said shaft; a bearing bushing in which the shaft is slidably and rotatably mounted and which serves also as a bearing for the bore of said body; the surface of the bushing adjacent said bore being generated by a curved element of relatively small but varying curvature; a lip member having a localized portion of increased thickness integral with the upper end of said bushing; a shoulder formed by a larger bored portion in said body and underlying said lip member in supporting relation; a cap member overlying said bushing and spaced a distance therefrom sufficient to permit rocking movement of the lip member in response to deflection of the corresponding end of the shaft without permitting axial displacement of the said bushing; and means for preventing rotation of said bushing with respect to the encircling body.

PHILLIP A. KINZIE.